(12) United States Patent
Kisumi et al.

(10) Patent No.: US 9,653,211 B2
(45) Date of Patent: May 16, 2017

(54) CONDUCTIVE PASTE, ELECTRONIC COMPONENT AND METHOD FOR MANUFACTURING ELECTRONIC COMPONENT

(71) Applicant: MURATA MANUFACTURING CO., LTD., Nagaokakyo-Shi (JP)

(72) Inventors: Tetsuya Kisumi, Nagaokakyo (JP); Toshiki Nagamoto, Nagaokakyo (JP); Yasuhiro Nishisaka, Nagaokakyo (JP); Yoko Okabe, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 286 days.

(21) Appl. No.: 14/457,167

(22) Filed: Aug. 12, 2014

(65) Prior Publication Data

US 2014/0347783 A1    Nov. 27, 2014

Related U.S. Application Data

(63) Continuation of application No. PCT/JP2013/050449, filed on Jan. 11, 2013.

(30) Foreign Application Priority Data

Feb. 29, 2012   (JP) .................................. 2012-043729

(51) Int. Cl.
*H01G 4/30* (2006.01)
*H01G 4/005* (2006.01)
(Continued)

(52) U.S. Cl.
CPC ............. *H01G 4/0085* (2013.01); *H01B 1/16* (2013.01); *H01B 1/22* (2013.01); *H01G 4/012* (2013.01);
(Continued)

(58) Field of Classification Search
CPC .......... H01G 4/30; H01G 4/232; H01G 4/228; H01G 4/0085; H01B 1/16
(Continued)

(56) References Cited

U.S. PATENT DOCUMENTS

| | | |
|---|---|---|
| 7,547,948 B2 | 6/2009 | Kamiya et al. |
| 2002/0096663 A1* | 7/2002 | Sato .......................... C03C 8/02 252/500 |
| 2005/0184278 A1 | 8/2005 | Miki |

FOREIGN PATENT DOCUMENTS

| | | |
|---|---|---|
| CN | 101692410 A | 4/2010 |
| CN | 102194899 A | 9/2011 |

(Continued)

OTHER PUBLICATIONS

PCT/JP2013/050449 Written Opinion dated Mar. 25, 2013.
International Search Report for PCT/JP2013/050449, mailing date Apr. 2, 2013.

*Primary Examiner* — Eric Thomas
*Assistant Examiner* — Arun Ramaswamy
(74) *Attorney, Agent, or Firm* — Arent Fox LLP

(57) ABSTRACT

A conductive paste includes a metal powder, a glass frit containing a Si component, and an organic vehicle. The metal powder has a flat shape with a ratio a/b of a maximum length a to a maximum thickness b of 2.5 or more, a molar content of $SiO_2$ in the glass frit is 36 to 59 percent by mole, and a volume content of the glass frit is 6 to 11 percent by volume. In external electrodes of a multilayer ceramic capacitor using this conductive paste, the molar content of $SiO_2$ in a glass phase is 38 to 60 percent by mole, and an occupation rate of the glass phase is 30% to 60% on the area ratio, and a maximum length c of the glass phase is 5 μm or less.

3 Claims, 4 Drawing Sheets

(51) Int. Cl.
- *H01G 4/228* (2006.01)
- *H01B 1/02* (2006.01)
- *H01G 4/008* (2006.01)
- *H01G 4/232* (2006.01)
- *H01B 1/16* (2006.01)
- *H01B 1/22* (2006.01)
- *H01G 4/012* (2006.01)

(52) U.S. Cl.
CPC ........... *H01G 4/232* (2013.01); *H01G 4/2325* (2013.01); *H01G 4/30* (2013.01)

(58) Field of Classification Search
USPC ......... 361/308.1, 306.1, 301.4, 303; 252/512
See application file for complete search history.

(56) References Cited

FOREIGN PATENT DOCUMENTS

| | | |
|---|---|---|
| JP | 2000-252158 A | 9/2000 |
| JP | 2003-323817 A | 11/2003 |
| JP | 2005-228610 A | 8/2005 |
| JP | 2005-228904 A | 8/2005 |
| JP | 2005-252158 A | 9/2005 |
| JP | 2005-268204 A | 9/2005 |

* cited by examiner

CONDUCTIVE PASTE, ELECTRONIC COMPONENT AND METHOD FOR MANUFACTURING ELECTRONIC COMPONENT

CROSS REFERENCE TO RELATED APPLICATIONS

The present application is a continuation of International application No. PCT/JP2013/050449, filed Jan. 11, 2013, which claims priority to Japanese Patent Application No. 2012-043729, filed Feb. 29, 2012, the entire contents of each of which are incorporated herein by reference.

FIELD OF THE INVENTION

The present invention relates to a conductive paste, an electronic component, and a method for manufacturing an electronic component, and more particularly relates to a conductive paste suitable for forming an external electrode, an electronic component, such as a multilayer ceramic capacitor, formed by using the conductive paste, and a method for manufacturing the electronic component.

BACKGROUND OF THE INVENTION

In concomitance with the development of electronic techniques in recent years, a reduction in size and an increase in capacity of electronic components, such as a multilayer ceramic capacitor, have been rapidly advanced.

In this type of electronic component, such as a multilayer ceramic capacitor, in general, after an external electrode-forming conductive paste is applied onto two end portions of a base component in which internal electrodes are embedded, external electrodes are formed by a firing treatment, and furthermore, in order to improved heat resistance and solder wettability of the external electrodes, plating films of Ni, Sn, solder, and/or the like are formed on the surfaces thereof so as to cover the external electrodes.

In addition, Patent Document 1 has proposed a multilayer ceramic capacitor in which a base component includes a $CaZrO_3$-based compound as a primary component, external electrodes each include a glass frit and a metal powder containing one of Cu, Ni, and a Cu—Ni alloy as a primary component, and the glass frit includes 8 to 36 percent by mole of $B_2O_3$, 31 to 62 percent by mole of $SiO_2$, 9 to 43 percent by mole in total of at least one of an alkali metal oxide and an alkaline earth metal oxide, and 0 to 3 percent by mole of ZnO.

In addition, Patent Document 1 has also disclosed that a penetration distance of a glass phase into the base component is controlled to be 1 to 8 μm.

In Patent Document 1, since a borosilicate zinc-based glass having the above molar composition is contained in the external electrode, the glass phase can be appropriately penetrated into the base component. By this penetration described above, it is intended to improve a bonding strength between the base component and the external electrode and plating adhesion properties thereof and also to suppress generation of structural defects of internal electrodes.

Patent Document 1: Japanese Unexamined Patent Application Publication No. 2005-228904 (claims 1 and 2, paragraph [0015], and the like)

SUMMARY OF THE INVENTION

Incidentally, in electronic components, such as a multilayer ceramic capacitor, the reduction in size and the increase in capacity have been advanced as described above, and from the points described above, in order to avoid the increase in size of the element, an attempt has been made to increase the thickness of the base component which contributes to obtaining the capacity and simultaneously to decrease the thickness the external electrode.

However, in Patent Document 1, since the glass phase is penetrated into the base component to a depth of 1 to 8 μm, when the thickness of the external electrode is decreased, for example, to 7 μm or less, the glass phase may not be present in a surface layer of the external electrode or may only be present in a very small amount therein. As a result, the external electrode may absorb outside moisture, and the moisture thus absorbed may intrude into the base component through the external electrode in some cases.

In addition, when a plating film is formed on the surface of the external electrode using a plating method, such as electrolytic plating, if the thickness of the external electrode is decreased, a plating solution may penetrate the external electrode and may further intrude into the base component in some cases.

According to the related technique disclosed in Patent Document 1, when the thickness of the external electrode is decreased, humidity resistance and plating solution resistance are degraded as described above, and as a result, degradation in performance of the electronic component may occur in some cases.

In consideration of the situation as described above, the present invention was made, and an object of the present invention is to provide a conductive paste suitable for forming an external electrode, an electronic component, such as a multilayer ceramic capacitor, which can secure the humidity resistance and the plating solution resistance without causing structural defects even if the thickness of an external electrode is decreased and which also has preferable plating adhesion properties, and a method for manufacturing an electronic component using the conductive paste described above.

In order to achieve the above object, intensive research on a molar content of a Si component in a glass frit contained in a conductive paste, a volume content of the glass frit, and the shape of a metal powder was carried out by the present inventors, and it was found that when the molar content of $SiO_2$ in the glass frit is set to 36 percent by mole to 59 percent by mole, the volume content of the glass frit is set to 6 percent by volume to 11 percent by volume, and as the metal powder, a metal powder having a flat shape with a ratio (hereinafter referred to as "aspect ratio") a/b of a maximum length a to a maximum thickness b of 2.5 or more is used, even if the thickness of the external electrode is decreased to 7 μm or less, a conductive paste simultaneously having the humidity/plating solution resistance and the plating adhesion properties can be obtained without causing any structural defects.

The present invention was made based on the findings as described above, and the conductive paste of the present invention is a conductive paste for forming an external electrode of an electronic component and comprises a metal powder, a glass frit containing at least a Si component, and an organic vehicle. In the conductive paste described above, the metal powder is formed to have a flat shape so that the ratio a/b of the maximum length a to the maximum thickness b is 2.5 or more, the molar content of the Si component in the glass frit is 36 percent by mole to 59 percent by mole in the form of $SiO_2$, and the volume content of the glass frit is 6 percent by volume to 11 percent by volume.

By the use of this conductive paste, even when an external electrode is formed, since the external electrode is sintered while the glass frit and the metal powder are appropriately mixed together, a glass phase may be allowed to be present in the external electrode, and hence, a sealing performance of a surface layer thereof can be improved without causing any structural defects of the electronic component. In addition, since a metal powder having the aspect ratio described above may be allowed to be present along the surface layer of the external electrode, the metal powder functioning as an origin to form a plating film may be sufficiently secured, and hence, desired preferable plating adhesion properties can be secured. Hence, as a result, an electronic-component external electrode simultaneously having the humidity/plating solution resistance and the plating adhesion properties can be obtained.

In addition, in the present invention, the above "flat shape" is a generic term indicating, for example, a flake, a scale, a plate, or a coin shape; the primary surface shape may include a circular shape, an oval shape, and a distorted shape having a recess; and as for the thickness, the shape is not limited to that formed to have a predetermined thickness, and a shape having an uneven thickness or a distorted shape may also be included.

In addition, when the present inventors analyzed an external electrode composition of an electronic component obtained by using the above conductive paste, it was found that the Si content in the glass phase was 38 percent by mole to 60 percent by mole. Furthermore, when analysis was performed by a predetermined method after the cross section of the electronic component in the vicinity of the external electrode was observed by a scanning electron microscope (hereinafter referred to as "SEM"), it was found that an occupation rate of a glass phase in the external electrode was 30% to 60% on the area ratio and that a maximum length c of the glass phase was 5 μm or less.

That is, the electronic component of the present invention is an electronic component in which an external electrode is formed so as to cover an end portion of a base component, and at least one plating film is formed on the surface of the external electrode; the external electrode is sintered in the state in which a glass phase containing at least a Si component and metal portions are mixed together; the molar content of the Si component in the glass phase is 38 percent by mole to 60 percent by mole in the form of $SiO_2$; the occupation rate of the glass phase in the external electrode is set to 30% to 60% on the area ratio; and the maximum length c of the glass phase is set to 5 μm or less. In addition, in order to calculate the occupation rate described above, in a central region of an end surface of the base component, a surrounded portion surrounded between the end surface and a first straight line is regarded as a region to be measured, the first straight line being parallel to the end surface and passing through the point on the interface between the external electrode and the plating film located at the shortest distance from the end surface of the base component. As for the maximum length c, in the central region of the end surface of the base component, after a glass phase present on an intermediate line which equally divides the distance between a second straight line and the first straight line is extracted, the second straight line being parallel to the end surface and passing through the point on the surface of the plating film in contact with the interface located at the longest distance from the end surface of the base component, of the extracted glass phase, the maximum length in a direction parallel to the end surface is regarded as the maximum length c.

Accordingly, a desired highly reliable electronic component can be obtained which has, besides the humidity resistance and the plating solution resistance, preferable plating adhesion properties and which suppresses the generation of structural defects, such as peeling and cracks, between the base component and the external electrode. Furthermore, when the crystal texture of the cross section of the external electrode is analyzed by the above method, the occupation rate and the maximum length c of the glass phase can be easily calculated.

Furthermore, in the electronic component of the present invention, the penetration distance of the glass phase into the base component is preferably 1 μm or less (including 0).

Accordingly, since the penetration of the glass phase into the base component can be avoided as much as possible, the formation of voids in the external electrode can be avoided, and the humidity resistance can be more effectively secured.

In addition, since the types of conductive pastes used for external electrodes of electronic components, which are widely spread on the market as final products, are difficult to be identified, besides the conductive paste, the electronic component is also included in Claims of the present invention.

In addition, a method for manufacturing an electronic component of the present invention is a method for manufacturing an electronic component in which an external electrode is formed on the surface of a base component, and the method is characterized in that after the conductive paste described above is applied on the surface of the base component, the external electrode is formed by performing a firing treatment.

Accordingly, various types of highly reliable compact electronic components each having a large capacity can be obtained, each of which has preferable humidity resistance and plating solution resistance even if the thickness of the external electrode is decreased, which also has preferable plating adhesion properties, and furthermore which can suppress the generation of structural defects.

In addition, in the method for manufacturing an electronic component of the present invention, the firing treatment is preferably performed at a temperature in the vicinity of a softening point (softening beginning temperature) of the glass frit contained in the conductive paste.

Accordingly, the formation of voids in the external electrode caused by a reaction between the glass frit and the base component can be avoided as much as possible, and the degradation in humidity resistance can be effectively avoided.

Since the conductive paste of the present invention includes a metal powder, a glass frit containing at least a Si component, and an organic vehicle, the metal powder is formed to have a flat shape with a ratio a/b of the maximum length a to the maximum thickness b of 2.5 or more, the molar content of the Si component in the glass frit is 36 to 59 percent by mole in the form of $SiO_2$, and the volume content of the glass frit is 6 to 11 percent by volume, when an external electrode is formed using the conductive paste described above, the external electrode is sintered while the glass frit and the metal powder are appropriately mixed together. Hence, the glass phase can be allowed to be present in the external electrode, and as a result, the sealing performance of the surface layer of the external electrode is improved without causing structural defects of the electronic component. In addition, since the metal powder having the above aspect ratio may be allowed to be present along the surface layer of the external electrode, the metal powder functioning as an origin to form a plating film may be sufficiently secured, and hence, desired preferable plating adhesion properties can be secured. Hence, as a result, an external electrode simultaneously having the humidity/plating solution resistance and the plating adhesion properties can be obtained.

The electronic component of the present invention is an electronic component in which an external electrode is formed so as to cover an end portion of a base component, and in which at least one plating film is formed on the surface of the external electrode. In the electronic component described above, the external electrode is sintered in the state in which a glass phase containing at least a Si component and metal portions are mixed with each other, the molar ratio of the Si component in the glass phase is 38 percent by mole to 60 percent by mole in the form of $SiO_2$, the occupation rate of the glass phase in the external electrode is 30% to 60% on the area ratio, and the maximum length c of the glass phase is set to 5 μm or less. The occupation rate is calculated in such a way that in a central region of an end surface of the base component, an area surrounded between the end surface and a first straight line which is parallel thereto and which passes the point on the interface between the external electrode and the plating film located at the shortest distance from the end surface of the base component is used as an area to be measured; and the maximum length c is obtained in such a way that in the central region of the end surface of the base component, after the glass phase present on an intermediate line which equally divides the distance between a second straight line and the first straight line is extracted, the second straight line being parallel to the end surface and passing through the point on the surface of the plating film in contact with the interface located at the longest distance from the end surface of the base component, of the glass phase thus extracted, the maximum length in a direction parallel to the end surface is regarded as the maximum length c. Accordingly, there can be obtained a desired electronic component in which even if the thickness of the external electrode is decreased, the humidity/plating solution resistance and the plating adhesion properties can be simultaneously obtained, and in which the generation of structural defects, such as peeling and cracks, between the base component and the external electrode are suppressed. Furthermore, when the crystal texture of the cross section of the external electrode is analyzed by the method described above, the occupation rate and the maximum length c can be easily calculated.

The method for manufacturing an electronic component of the present invention is a method for manufacturing an electronic component which manufactures an electronic component by forming an external electrode on a surface of a base component, and the external electrode is formed by applying the conductive paste described above on the surface of the base component, followed by performing a firing treatment; hence, a highly reliable compact electronic component having a large capacity can be obtained which has preferable humidity/plating solution resistance even if the thickness of the external electrode is decreased, which also has preferable plating adhesion properties, and furthermore which can suppress the generation of structural defects.

DETAILED DESCRIPTION OF THE PREFERRED EMBODIMENTS

Figure 1:
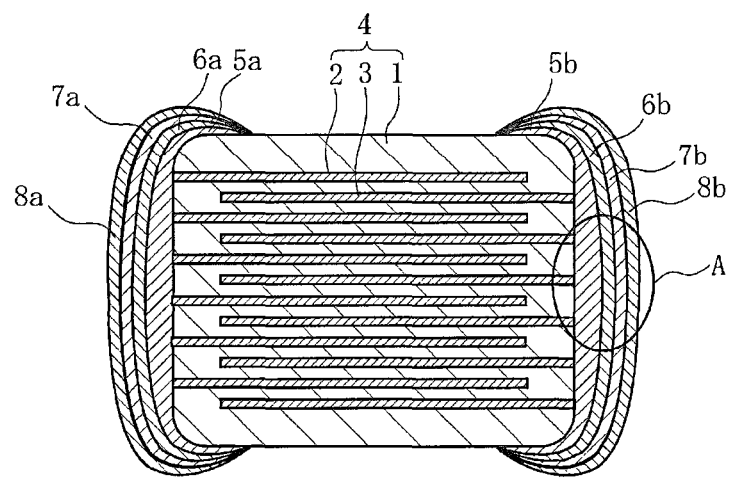
FIG. 1 is a cross-sectional view schematically showing a multilayer ceramic capacitor as one embodiment of an electronic component of the present invention.

Next, embodiments of the present invention will be described in detail.

A conductive paste of the present invention includes a metal powder, a glass frit containing at least a Si component, and an organic vehicle. In addition, the metal powder is formed to have a flat shape with an aspect ratio (ratio of a maximum length a to a maximum thickness b) a/b of 2.5 or more, the molar content of the Si component in the glass frit is 36 to 59 percent by mole in the form of $SiO_2$, and the volume content of the glass frit is set to 6 to 11 percent by volume.

The above "flat shape" is a generic term indicating, for example, a flake, a scale, a plate, or a coin shape; the primary surface shape may include a circular shape, an oval shape, or a distorted shape having a recess; and as for the thickness, the flat shape is not limited to that formed to have a predetermined thickness, and a shape having an uneven thickness may also be included.

When an external electrode of an electronic component is formed using this conductive paste, since the external electrode is sintered while the glass frit and the metal powder are appropriately mixed together, a glass phase may be allowed to be present in the external electrode, and hence, a sealing performance of a surface layer of the external electrode can be improved without causing structural defects of the electronic component. In addition, since the sealing performance of the surface layer of the external electrode is improved, intrusion of moisture from outside air and intrusion of a plating solution in a plating step can be avoided, and humidity/plating solution resistance can be improved. In addition, since the metal powder functioning as an origin to form a plating film has a flat shape as described above, the metal powder may be allowed to be present along the surface layer of the external electrode, and even when a plating treatment is performed on the surface of the external electrode, the plating film can be avoided from being discontinuously formed, so that preferable plating adhesion properties can be secured.

Since the conductive paste is used as described above, an electronic component, such as a multilayer ceramic capacitor, which simultaneously has the humidity/plating solution resistance and the plating adhesion properties can be obtained.

Next, the reasons the molar content of the Si component in the glass frit, the volume content of the glass frit, and the aspect ratio a/b of the metal powder are set to the ranges described above will be described in detail.

(1) Molar Content of Si Component in Glass Frit

The Si component is a primary component of the glass frit and is amorphized to form a mesh network structure.

However, when the molar content of the Si component in the glass frit is decreased, the mesh network structure may not be sufficiently formed, and hence when a plating treatment is performed on the surface of the external electrode, the glass phase in the external electrode may be dissolved in a plating solution in some cases. In particular, when the thickness of the external electrode is decreased, the plating solution dissolving the glass phase may penetrate the external electrode and may further intrude into the base component in some cases. In order to avoid the situation as described above, it is necessary to set the molar content of the Si component of the glass phase after firing to 38 percent by mole or more in the form of $SiO_2$, and for this purpose, the molar content of the Si component of the glass frit in the conductive paste before firing must be set to 36 percent by mole or more.

On the other hand, when the molar content of the Si component in the glass phase after firing is more than 60 percent by mole in the form of $SiO_2$, a fixing strength between the base component and the external electrode is decreased, and the structural defects, such as peeling, may occur in some cases. In addition, in order to avoid the situation as described above, it is necessary to control the molar content of the Si component in the glass phase after firing to 60 percent by mole or less, and for this purpose, the molar content of the Si component in the glass frit in the conductive paste before firing must be set to 59 percent by mole or less.

Accordingly, in this embodiment, the molar content of the Si component in the glass phase in the conductive paste is controlled to be 36 to 59 percent by mole in the form of $SiO_2$.

In addition, the molar content of the Si component in the form of $SiO_2$ is more preferably set to 45 percent by mole or more in the glass phase after firing and set to 43 percent by mole or more in the glass frit before firing. By the control as described above, the amount of the glass phase in the external electrode which is dissolved in a plating solution can be further decreased.

(2) Volume Content of Glass Frit

When the glass frit is contained in the conductive paste, a glass phase sufficient for the external electrode after firing can be formed, and the sealing performance can be improved. In addition, as a result, intrusion of moisture from outside air and intrusion of a plating solution in a plating step can be avoided, and hence the humidity resistance and the plating solution resistance can be improved.

However, when the volume content of the glass frit is less than 6 percent by volume, since the volume content of the glass frit is excessively small, an adhesion strength between the base component and the external electrode cannot be sufficiently secured, and as a result, structural defects, such as peeling, may arise in some cases.

On the other hand, when the volume content of the glass frit is more than 11 percent by volume, the glass phase is excessively formed in the surface layer, and the conductivity of the external electrode is decreased; hence, when electrolytic plating is performed, the plating film may not be continuously formed on the external electrode in some cases.

Hence, in this embodiment, the volume content of the glass frit in the conductive paste is set to 6 to 11 percent by volume.

As the glass frit as described above, although any material may be used as long as containing a Si component, in general, a Si—B-based glass frit containing $SiO_2$ and $B_2O_3$ as primary components is preferably used. In addition, a Si—B-A (A: alkali metal)-based glass frit in which an alkali metal oxide, such as $Li_2O$, $Na_2O$, or $K_2O$, is added to $SiO_2$ and $B_2O_3$, a Si—B—Bi-based glass frit in which $Bi_2O_3$ is added to $SiO_2$ and $B_2O_3$, a Si—B—Zn-based glass frit in which $ZnO_2$ is added to $SiO_2$ and $B_2O_3$, or a Si—B—Zr—Ti-based glass frit in which $ZrO_2$ and $TiO_2$ are added to $SiO_2$ and $B_2O_3$ may be appropriately used.

(3) Aspect Ratio a/b of Metal Powder

When a predetermined amount of the glass frit is contained in the conductive paste, the glass phase is formed in the surface layer of the external electrode as described above, and thereby the sealing performance can be improved, so that the humidity resistance and the plating solution resistance can be improved.

However, when the aspect ratio a/b of the metal powder is less than 2.5, besides excessive formation of the glass phase in the surface layer, since the metal powder may have a spherical or an oval shape, and a metal powder functioning as an origin to form a plating film may not be sufficiently secured in the surface layer, the plating adhesion properties are degraded, and the plating film may not be continuously formed in some cases.

Hence, in the conductive paste described above, by the use of the metal powder having an aspect ratio a/b of 2.5 or more, the metal powder functioning as an origin to form a plating film is allowed to be present along the surface layer, so that desired preferable plating adhesion properties can be obtained.

Although the upper limit of the aspect ratio a/b described above is not particularly limited, in order to secure the balance with the glass phase generated in the surface layer of the external electrode, the above aspect ratio a/b is preferably 10.5 or less.

Although the metal powder as described above is not particularly limited, a low-cost base metal material, such as Cu, Ni, or a Cu—Ni alloy, having good conductivity may be preferably used.

This conductive paste may be easily manufactured in such a way that the metal powder having a flat shape, the glass frit, and an organic vehicle are weighed and mixed together to have a predetermined mixing ratio and are then further dispersed and kneaded together using a three-roll mill or the like.

In this case, the organic vehicle is formed by dissolving a binder resin in an organic solvent, and the mixing ratio between the binder resin and the organic solvent is set, for example, to a volume ratio of 1 to 3:7 to 9.

In addition, the binder resin described above is not particularly limited, and for example, an ethyl cellulose resin, a nitro cellulose resin, an acrylic resin, an alkyd resin, or a mixture thereof may be used. In addition, the organic solvent is also not particularly limited, and for example, α-terpineol, xylene, toluene, diethylene glycol monobutyl ether, diethylene glycol monobutyl ether acetate, diethylene glycol monoethyl ether, and diethylene glycol monoethyl ether acetate may be used alone, or at least two thereof may be used in combination.

In addition, if necessary, for example, a dispersant and/or a plasticizer may be added to the conductive paste.

Next, an electronic component manufactured by using this conductive paste will be described in detail.

FIG. 1 is a cross-sectional view schematically showing one embodiment of a multilayer ceramic capacitor as an electronic component of the present invention.

This multilayer ceramic capacitor includes a base component 4 in which dielectric layers 1 and internal electrodes 2 and 3 are alternately laminated to each other, and external electrodes 5a and 5b are formed on external surfaces of the base component 4. In addition, on the surfaces of the external electrodes 5a and 5b, first plating films 6a and 6b are formed, respectively; on the surfaces of the first plating films 6a and 6b, second plating films 7a and 7b are formed, respectively; and on the surfaces of the second plating films 7a and 7b, third plating films 8a and 8b are formed, respectively.

The internal electrodes 2 are extended to one end surface and are electrically connected to the external electrode 5a, and the internal electrodes 3 are extended to the other end surface and are electrically connected to the external electrode 5b, so that it is configured to obtain an electrostatic capacity using the dielectric layers 1 provided between the internal electrodes 2 and 3.

Although a material forming the internal electrodes 2 and 3 is not particularly limited, a low-cost material, such as Ni, Cu, Ag, or an alloy containing at least one of them, is preferably used.

In consideration of the plating adhesion properties, the conductivity, and the like, the first plating films 6a and 6b are preferably formed of a material similar to that of the metal powder in the external electrodes 5a and 5b. For example, when Cu or a Cu alloy is used for the metal powder, Cu or a Cu alloy is preferably used, and when Ni or a Ni alloy is used for the metal powder, Ni or a Ni alloy is preferably used. In addition, in order to obtain preferable heat resistance, the second plating films 7a and 7b are formed of Ni or a Ni alloy. Furthermore, in order to obtain preferable plating adhesion properties, the third plating films 8a and 8b are formed of Sn, solder, or the like.

In addition, this multilayer ceramic capacitor may be manufactured as described below.

First, after ceramic raw materials, such as a Ba compound and a Ti compound, are prepared, and predetermined amounts thereof are weighed, the raw materials thus weighed are charged in a ball mill with pulverizing media, such as PSZ (partially stabilized zirconia) balls, and purified water and are sufficiently mixed and pulverized in a wet state, followed by drying. Subsequently, calcination is performed at 900° C. to 1,200° C. for a predetermined time, so that a calcined powder of a barium titanate compound or the like is formed.

Next, after this calcined powder is again charged in a ball mill with an organic binder, an organic solvent, and pulverizing media for wet mixing to form a ceramic slurry, the ceramic slurry thus formed is processed by a doctor blade method or the like, so that ceramic green sheets each having a predetermined thickness are formed.

Next, a metal powder, such as a Ni powder, is mixed with an organic vehicle and an organic solvent and is then kneaded by a three-roll mill or the like, so that an internal electrode-forming conductive paste (hereinafter referred to as "second conductive paste") is formed.

Subsequently, screen printing is performed on ceramic green sheets using this second conductive paste, so that conductive films each having a predetermined pattern are formed on the surfaces of the ceramic green sheets.

Next, after the ceramic green sheets on which the conductive films are formed are laminated to each other in a predetermined direction, the laminate thus formed is sandwiched between ceramic green sheets on which no conductive films are formed. Next, pressure bonding is performed on those ceramic green sheets, and cutting thereof is then performed to form a ceramic laminate having a predetermined dimension. Subsequently, a debinding treatment is performed at a temperature of 300° C. to 500° C., and furthermore, in a reducing atmosphere containing a $H_2$—$N_2$—$H_2O$ gas in which the oxygen partial pressure is controlled to $10^{-9}$ to $10^{-12}$ MPa, a firing treatment is performed at a temperature of 1,100° C. to 1,300° C. for approximately 2 hours. Accordingly, the conductive films and the ceramic green sheets are co-sintered, so that the base component 4 in which the dielectric layers 1 and the internal electrodes 2 and 3 are alternately laminated to each other is formed.

Next, after the conductive paste of the present invention described above is applied to two end portions of the base component 4 so that the thickness obtained after the firing is, for example, 7 μm or less, a firing treatment is performed, so that the external electrodes 5a and 5b are formed.

In this step, the firing treatment is preferably performed at a temperature in the vicinity of the softening point of the glass frit contained in the conductive paste.

That is, in the conductive paste of the present invention, although the molar content of the Si component in the glass frit is high, such as 36 to 59 percent by mole in the form of $SiO_2$, when the molar content of the Si component in the glass frit is high as described above, as the softening point of the glass frit is increased, the wettability between the glass frit and the metal powder or the base component 4 is liable to be degraded, and hence, after the firing treatment, the glass frit may be segregated in the surface layers of the external electrodes 5a and 5b in some cases.

Hence, the firing treatment is preferably performed at a temperature (such as 600° C. to 700° C.) in the vicinity of the softening point of the glass frit as described above.

In addition, finally, by performing electrolytic plating, the first plating films 6a and 6b of Ni, Cu, a Ni—Cu alloy, or the like are formed on the surfaces of the external electrodes 5a and 5b, respectively; the second plating films 7a and 7b of Ni or the like are formed on the surfaces of the first plating films 6a and 6b, respectively; and the third plating films 8a and 8b of solder, tin, or the like are formed on the surfaces of the second plating films 7a and 7b, respectively, so that the multilayer ceramic capacitor is formed.

In the multilayer ceramic capacitor as described above, since the molar content of the Si component of the glass frit in the conductive paste is set to 36 to 59 percent by mole in the form of $SiO_2$, the molar content of the Si component in a glass phase 10 after firing is 38 to 60 percent by mole in the form of $SiO_2$, and thereby the glass phase 10 is prevented from being dissolved in a plating solution in the plating treatment; hence, the plating solution can be avoided from intruding into the external electrodes 5a and 5b. In addition, since a sufficient fixing strength can be ensured, the structural defects, such as peeling and cracks, can also be prevented.

In addition, since the volume content of the glass frit in the conductive paste is 6 to 11 percent by volume, the occupation rate of the glass phase 10 in each of the external electrodes 5a and 5b is set to 30% to 60% on the area ratio, a sufficient amount of the glass phase 10 can be formed in the surface layer of each of the external electrode 5a and 5b, and a preferable fixing strength and preferable humidity/plating solution resistance can be obtained.

In addition, since the aspect ratio a/b of the metal powder is 2.5 or more, the maximum length c of the glass phase 10 can be controlled to be 5 μm or less, and hence the glass phase is formed so as to secure the sealing performance. Furthermore, since the metal powder functioning as an origin to form a plating film may be allowed to be present along the surface layer, preferable plating adhesion properties can be obtained, and the continuity of the plating film can also be secured.

Next, methods for calculating the occupation rate of the glass phase 10 and the maximum length c of the glass phase 10 will be described.

Hereinafter, although the occupation rate of the glass phase 10 and the maximum length c of the glass phase 10 will be described using the external electrode 5b, this description is also applied to the external electrode 5a.

Figure 2:
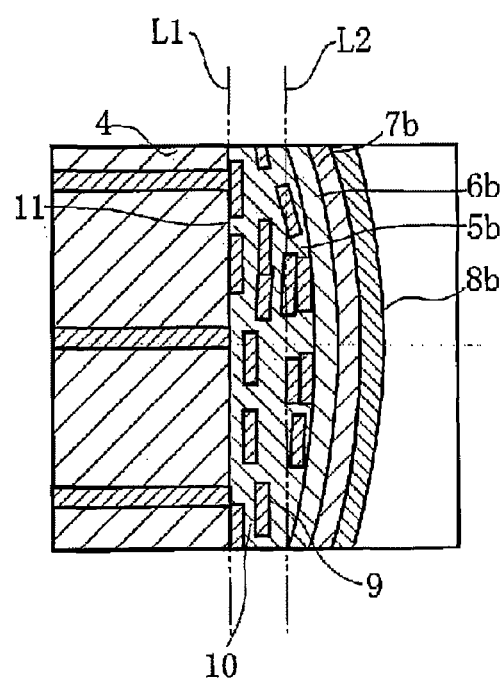
FIG. 2 is an enlarged cross-sectional view of the A portion shown in FIG. 1 illustrating a method for calculating an occupation rate of a glass phase.

FIG. 2 is an enlarged cross-sectional view of the central region (A portion in FIG. 1) of the end surface of the base component 4.

That is, the external electrode 5b is formed so as to cover the surface of the end portion of the base component 4, and the first to the third plating films 6b to 8b are formed in the form of layers so as to cover the surface of the external electrode 5b.

In addition, the external electrode 5b is sintered in the state in which metal portions 9 each containing the metal powder as a primary component and the glass phase 10 formed from the glass frit are mixed together.

First, as shown in FIG. 2, a straight line L1 in contact with an end surface 11 of the base component 4 is drawn. Next, a straight line (first straight line) L2 is drawn which is parallel to the end surface 11 and which passes through the point on the interface between the external electrode 5b and the first plating film 6b located at the shortest distance from this end surface 11. In addition, an area surrounded by the straight line L1 and the straight line L2 is regarded as an area to be measured, and the area of the surrounded area and the area occupied by the glass phase 10 are obtained, so that the area ratio of the glass phase 10, that is, the occupation rate, can be calculated. In addition, the metal portion 9 and the glass phase 10 can be easily discriminated from each other when the cross section of the external electrode 5b in the central region of the end surface of the base component 4 is binarized into a white color and a gray color on a SEM image.

In addition, in this embodiment, the volume content of the glass frit in the conductive paste is set to 6 to 11 percent by volume, so that the occupation rate of the glass phase 10 is controlled to be 30% to 60% on the area ratio.

Figure 3:
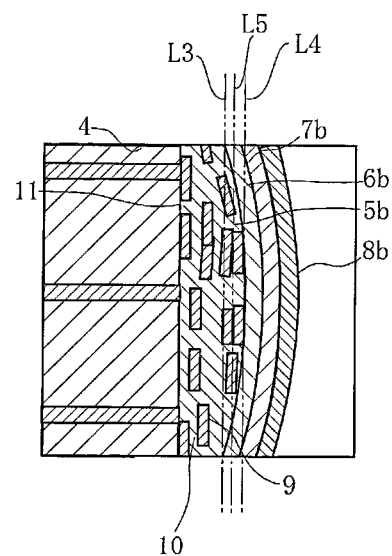
FIG. 3 is an enlarged cross-sectional view of the A portion shown in FIG. 1 illustrating a method for calculating a maximum length c of a glass phase.
Figure 4:
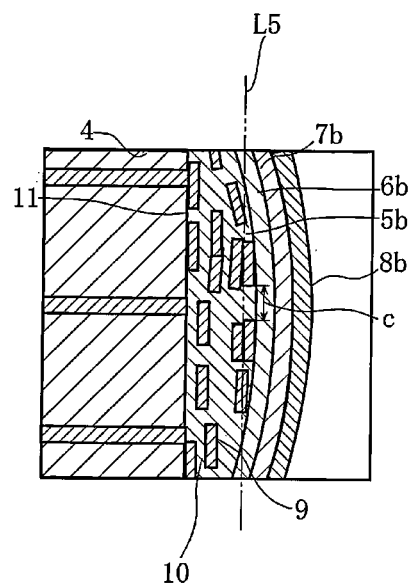
FIG. 4 is an enlarged cross-sectional view of the A portion shown in FIG. 1 illustrating the method for calculating a maximum length c of a glass phase.

FIGS. 3 and 4 show a method for calculating the maximum length c of the glass phase 10.

First, as shown in FIG. 3, as is the case shown in FIG. 2, in the central region of the end surface of the base component 4, a straight line L3 (first straight line) is drawn which is parallel to the end surface 11 and which passes through the point on the interface between the external electrode 5b and the first plating film 6b located at the shortest distance from the end surface 11 of the base component 4. In addition, a straight line L4 (second straight line) is drawn which is parallel to the end surface 11 and which passes through the point on the surface of the first plating film 6b located at the longest distance from the end surface 11 of the base component 4. Subsequently, an intermediate line L5 equally dividing the distance between the straight line L3 and the straight line L4 is drawn.

In addition, after the glass phase 10 present on the intermediate line L5 as shown in FIG. 4 is extracted, the individual lengths of the glass phase 10 thus extracted parallel to the end surface 11 are measured, and the maximum value is regarded as the maximum length c.

In this embodiment, since the metal powder having a flat shape with an aspect ratio a/b of 2.5 or more is used, the maximum length c of the glass phase 10 can be controlled to be 5 µm or less, so that more preferable plating adhesion properties can be secured.

In the multilayer ceramic capacitor described above, since the external electrodes 5a and 5b are sintered in the state in which the glass frit containing at least a Si component and the metal powder are mixed together, the molar content of the Si component in the glass frit is 38 to 60 percent by mole in the form of $SiO_2$, the occupation rate of the glass phase in each of the external electrodes 5a and 5b is 30% to 60% on the area ratio, and the maximum length c of the glass phase 10 is 5 µm or less, a desired multilayer ceramic capacitor can be obtained in which even if the thickness of each of the external electrodes 5a and 5b is small, the humidity/plating solution resistance and the plating adhesion properties can be simultaneously obtained, and the generation of structural defects, such as peeling and cracks, between the base component 4 and each of the external electrodes 5a and 5b can be suppressed.

In addition, since the firing treatment is performed at a temperature in the vicinity of the softening point of the glass frit as described above, the penetration distance of the glass phase 10 into the base component 4 can be controlled to be 1 µm or less (including 0), and hence the glass phase 10 can be avoided from reacting with the base component 4.

That is, when the firing treatment described above is performed at a temperature sufficiently higher than the softening point of the glass frit, since the glass phase 10 in each of the external electrodes 5a and 5b reacts with and penetrates the base component 4 at a depth of 1 µm or more, voids are generated in the external electrodes 5a and 5b, and moisture is absorbed, so that a desired humidity resistance may not be obtained in some cases.

Hence, in this embodiment, when the firing treatment is preferably performed at a temperature in the vicinity of the softening point of the glass frit, the penetration distance of the glass phase 10 into the base component 4 is controlled to be 1 µm or less (including 0), and thereby the generation of voids in the external electrodes 5a and 5b is avoided, so that a desired humidity resistance is secured.

Incidentally, the present invention is not limited to the embodiments described above and, of course, may be variously changed without departing from the scope of the present invention. In the above embodiments, although the multilayer ceramic capacitor has been described as the electronic component by way of example, the present invention may also be applied to a single plate ceramic capacity and, of course, may also be applied to other electronic components, such as a piezoelectric component.

In addition, in the above embodiments, although the plating film having a three-layer structure has been described by way of example, the plating film may have at least one plating layer, and either a monolayer structure or a two-layer structure may also be used as in the case described above.

Next, Examples of the present invention will be described in detail.

Example 1

[Conductive Paste]

First, $H_2BO_2$, $SiO_2$, and $A_2CO_3$ (A: Li, Na, or K) were weighed so that a molar content of $SiO_2$ was 6 to 62 percent by mole. In this example, the molar content of $SiO_2$ was obtained by a point analysis using a WDX (wavelength-dispersive x-ray analysis) method after the conductive paste was formed.

Next, after the materials thus weighed were melted at 1,000° C. to 1,400° C. and were then vitrified by rapid cooling, coarse pulverization and fine pulverization were performed in this order, so that a glass frit having an average particle diameter of 5 µm was formed.

In addition, an organic vehicle containing 30 percent by weight of an acrylic resin, 40 percent by weight of 3-methoxy-3-methyl-1-butanol, and 30 percent by weight of terpineol was formed.

Next, after a Cu powder having an aspect ratio a/b of 4.5, the glass frit, and the organic vehicle were mixed with a dispersant so as to obtain a mixture containing 11.5 percent by volume of the Cu powder, 8.5 percent by volume of the glass frit, 79.7 percent by volume of the organic vehicle, and 0.3 percent by volume of the dispersant, kneading and dispersing were performed by a three-roll mill, so that test materials (conductive pastes) of Samples Nos. 1 to 9 were formed.

In this example, the aspect ratio a/b of the above Cu powder was measured as described below.

First, the above Cu powder was kneaded and dispersed in an organic vehicle to form an aspect-ratio measurement paste. Next, the above measurement paste was applied on a PET (poly(ethylene terephthalate)) film on which a mold release agent was applied, followed by performing drying, so that a Cu sheet was formed on the PET film. Subsequently, after the Cu sheet was peeled off from the PET film, the Cu film was embedded in a resin which was independently prepared, and the resin was then cured. Next, an end surface of the resin was polished to expose the Cu sheet, so that a measurement sample was formed.

Next, this measurement sample was photographed using a SEM, so that a SEM image was obtained. Subsequently, the average values of a maximum length a and a maximum thickness b were calculated from 20 particles of the Cu powder in the SEM image using a length measurement function of an image processing software ("A image kun" (registered trade mark, manufactured by Asahi Engineering Corp.), so that the aspect ratio a/b was measured.

The aspect ratio a/b of the Cu powder was measured as described above, and it was confirmed that the aspect ratio a/b was 4.5.

[Formation of Multilayer Ceramic Capacitor]

Ceramic green sheets each containing $BaTiO_3$ as a primary component and a second conductive paste which contained Ni as a conductive component and which was used to form internal electrodes were prepared.

Next, after conductive patterns were formed using this second conductive paste on surfaces of a predetermined number of ceramic green sheets by screen printing so that one end of each pattern was exposed to one end surface of each ceramic green sheet, the ceramic green sheets on which the conductive patterns were thus formed were laminated to each other and were then sandwiched by a predetermined number of ceramic green sheets on which not conductive patterns were formed. Subsequently, after the ceramic green sheets thus prepared were pressure-bonded to form a green ceramic laminate, a firing treatment was performed at a temperature of 1,300° C. in a reducing atmosphere, so that many base components were formed.

Next, the conductive pastes of Samples Nos. 1 to 9 were each applied on two end surface of each base component by a dipping method so as to have a thickness of 7 μm or less after firing. Subsequently, after the base component was dried at 150° C., a firing treatment was performed at 650° C. for 10 minutes in a reducing atmosphere, so that external electrodes were formed on the two end surfaces of the base component.

Next, electrolytic plating was performed on each external electrode to sequentially form a Cu film, a Ni film, and a Sn film on the external electrode, so that test elements (multilayer ceramic capacitors) of Samples Nos. 1 to 9 were formed.

In addition, the outside dimensions of the sample thus formed were 1.0 mm in length, 0.5 mm in width, and 0.5 mm in thickness.

[Evaluation of Samples]

A point analysis of the central region of the end surface of the base component of each of the test elements of Samples Nos. 1 to 9 was performed by a WDX method, so that the composition analysis of the glass phase in the external electrode was performed.

Next, the insulating resistances of 74 multilayer ceramic capacitors of each of Samples Nos. 1 to 9 were measured before and after the formation of the plating films (the Cu film, the Ni film, and the Sn film) using an insulating resistance tester.

When all the 74 multilayer ceramic capacitors of each sample had an insulating resistance of $10^{-6}\Omega$ or more, it was judged that intrusion of moisture and a plating solution which actually degraded the performance did not occur, and the humidity/plating solution resistance was evaluated as good (○). In addition, when at least one of the 74 multilayer ceramic capacitors of each sample had an insulating resistance of less than $10^{-6}\Omega$, the humidity resistance/plating solution resistance was evaluated as no good (x).

In addition, after a lead wire was soldered to the external electrode of the test element of each of Samples Nos. 1 to 9, the base component was fixed to a tensile testing machine by a chuck, and the lead wire was pulled at a rate of 20 mm/min, so that an electrode fixing strength was measured.

Next, a test element having an electrode fixing strength of 5 $N/cm^2$ or more was judged that the structural defects, such as peeling, did not occur and was evaluated as good (○), and a test element having an electrode fixing strength of less than 5 $N/cm^2$ was evaluated as no good (x).

Table 1 show the content of $SiO_2$ before firing, the volume content of the glass frit, the aspect ratio a/b of the metal powder, the glass composition after firing, the humidity/plating solution resistance, and the fixing strength of each of Samples Nos. 1 to 9.

TABLE 1

| Sample No. | Content of $SiO_2$ before Firing (mol %) | Volume Content of Glass Frit (vol %) | Aspect Ratio a/b of Metal Powder | Glass Composition after Firing (mol %) | | | Humidity/Plating Solution Resistance | | Fixing Strength | |
|---|---|---|---|---|---|---|---|---|---|---|
| | | | | $SiO_2$ | $B_2O_3$ | $A_2O$ | Number of Defects | Judgment | $N/cm^2$ | Judgment |
| 1* | 6 | 8.5 | 4.5 | 10 | 40 | 50 | 30/74 | x | 19 | ○ |
| 2* | 31 | 8.5 | 4.5 | 38 | 20 | 42 | 25/74 | x | 18 | ○ |
| 3 | 36 | 8.5 | 4.5 | 38 | 20 | 42 | 0/74 | ○ | 17 | ○ |
| 4 | 40 | 8.5 | 4.5 | 42 | 20 | 38 | 0/74 | ○ | 16 | ○ |
| 5 | 43 | 8.5 | 4.5 | 45 | 20 | 35 | 0/74 | ○ | 15 | ○ |
| 6 | 48 | 8.5 | 4.5 | 50 | 30 | 20 | 0/74 | ○ | 14 | ○ |

TABLE 1-continued

| Sample No. | Content of SiO$_2$ before Firing (mol %) | Volume Content of Glass Frit (vol %) | Aspect Ratio a/b of Metal Powder | Glass Composition after Firing (mol %) | | | Humidity/Plating Solution Resistance | | Fixing Strength | |
|---|---|---|---|---|---|---|---|---|---|---|
| | | | | SiO$_2$ | B$_2$O$_3$ | A$_2$O | Number of Defects | Judgment | N/cm$^2$ | Judgment |
| 7 | 51 | 8.5 | 4.5 | 55 | 15 | 30 | 0/74 | ◯ | 11 | ◯ |
| 8 | 59 | 8.5 | 4.5 | 60 | 20 | 20 | 0/74 | ◯ | 9 | ◯ |
| 9* | 62 | 8.5 | 4.5 | 65 | 20 | 15 | 0/74 | ◯ | 4 | x |

*indicates out of the range of the present invention.

As shown in Table 1, it was found that in Sample No. 1, since the content of SiO$_2$ in the glass phase after firing was low, such as 10 percent by mole, and a mesh network structure could not be sufficiently formed, the glass phase was dissolved in a plating solution, and the plating solution intruded into the external electrode, so that the humidity/plating solution resistance was inferior.

In addition, it was found that in Sample No. 2, although the content of SiO$_2$ in the glass phase after firing was 38 percent by mole and was increased as compared to that of Sample No. 1, since the content of SiO$_2$ was still too low to avoid the dissolution of the glass phase into the plating solution, the mesh network structure could not be sufficiently formed, and as in the case of Sample No. 1, the plating solution intruded into the external electrode, so that the humidity/plating solution resistance was inferior.

Furthermore, it was found that in Sample No. 9, although the content of SiO$_2$ in the glass phase after firing was high, such as 65 percent by mole, and the humidity/plating solution resistance could be secured, the fixing strength was low, such as 4 N/cm$^2$, and hence the fixing strength of Sample No. 9 was inferior.

On the other hand, it was found that in Samples Nos. 3 to 8, since the molar content of SiO$_2$ in the glass phase after firing was 38 to 60 percent by mole and was in the range of the present invention, even if the thickness of the external electrode was small, such as 7 μm or less, the humidity/plating solution resistance could be secured without degrading the fixing strength.

Example 2

Test materials (conductive pastes) of Samples Nos. 11 to 17 were formed in such a way that the volume content of a glass frit was set to 5 to 12 percent by volume, the amount of a Cu powder was adjusted in accordance with the decrease or the increase in volume content of the glass frit, and the volume contents of an organic vehicle and a dispersant were set similar to those in Example 1. In this example, the aspect ratio a/b of the Cu powder was 4.5 which was the same as that in Example 1.

Subsequently, test elements (multilayer ceramic capacitors) of Samples Nos. 11 to 17 were formed by a method and a procedure similar to those in Example 1.

Next, the humidity/plating solution resistance and the fixing strength of the test element of each of Samples Nos. 11 to 17 were evaluated by a method and a procedure similar to those in Example 1.

In addition, the cross section of the external electrode in the central region of the end surface of the base component of each test element was observed by a SEM, so that the occupation rate of the glass phase in the external electrode was obtained on the area ratio.

Hereinafter, although an example of calculating the occupation rate of the glass phase will be shown by using the test element of Sample No. 14, the calculation of the occupation rate was also performed for the test element of each of the other Samples by a method similar to that described below.

Figure 5:
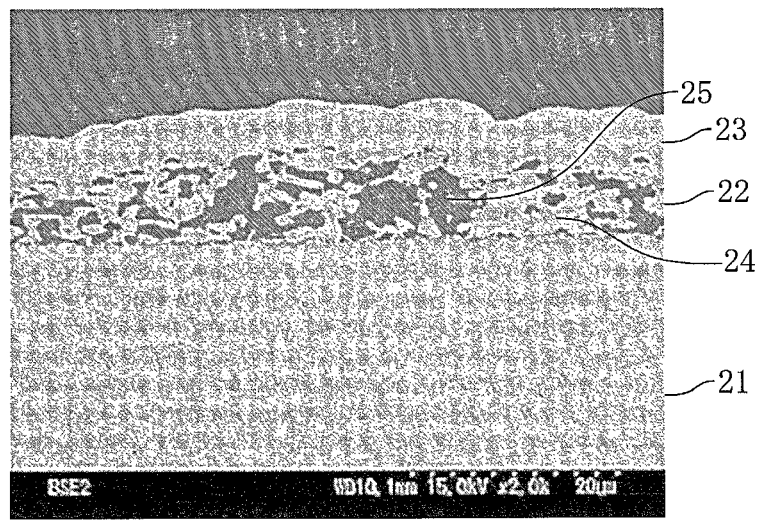
FIG. 5 is a SEM image of Sample No. 14 of Example 2.

That is, FIG. 5 is a SEM image obtained in such a way that after the cross section of one external electrode of Sample No. 14 was polished, and a part thereof in the central region of the end surface of the base component was photographed at a magnification of 2,000 times.

As shown in FIG. 5, an external electrode 22 was formed on the surface of a base component 21, and a plating film 23 (including a Cu film, a Ni film, and a Sn film) was formed on the surface of the external electrode 22. In addition, for the convenience of image analysis of the inside of the external electrode 22, the image was binarized into a gray color and a white color, the white color indicated a metal portion 24 containing Cu as a primary component, and the gray color indicated a glass phase 25.

Figure 6:
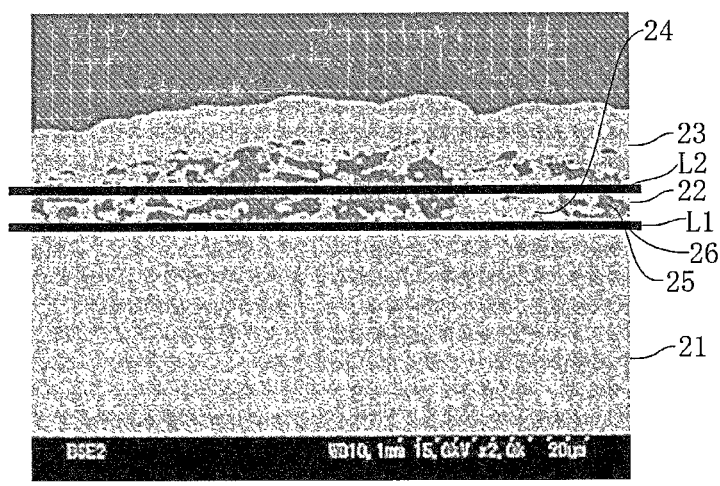
FIG. 6 is the SEM image of Sample No. 14 of Example 2 illustrating one example of the method for calculating an occupation rate of a glass phase.

In addition, as shown in FIG. 6, a straight line L1 in contact with an end surface 26 of the base component 21 was drawn, and a straight line L2 was drawn which was parallel to the straight line L1 and which passed through the point of the plating film 23 located at the shortest distance from the end surface 26.

Next, the area of the glass phase 25 with respect to the area of the external electrode 22 was calculated, so that the occupation rate (area ratio) of the glass phase 25 was obtained.

Table 2 shows the content of SiO$_2$ before firing, the volume content of the glass frit, the aspect ratio of the metal powder, the glass composition after firing, the occupation rate of the glass phase, the humidity/plating solution resistance, and the fixing strength of each of Samples Nos. 11 to 17.

TABLE 2

| Sample No. | Content of SiO$_2$ before Firing (mol %) | Volume Content of Glass Frit (vol %) | Aspect Ratio a/b of Metal Powder | Glass Composition after Firing (mol %) | | | Occupation Rate of Glass Frit (%) | Humidity/Plating Solution Resistance | | Fixing Strength | |
|---|---|---|---|---|---|---|---|---|---|---|---|
| | | | | SiO$_2$ | B$_2$O$_3$ | A$_2$O | | Number of Defects | Judgment | N/cm$^2$ | Judgment |
| 11* | 51 | 5 | 4.5 | 55 | 15 | 30 | 27 | 0/74 | ◯ | 4 | x |
| 12 | 51 | 6 | 4.5 | 55 | 15 | 30 | 30 | 0/74 | ◯ | 8 | ◯ |
| 13 | 51 | 7 | 4.5 | 55 | 15 | 30 | 40 | 0/74 | ◯ | 9 | ◯ |

TABLE 2-continued

| Sample No. | Content of SiO$_2$ before Firing (mol %) | Volume Content of Glass Frit (vol %) | Aspect Ratio a/b of Metal Powder | Glass Composition after Firing (mol %) | | | Occupation Rate of Glass Frit (%) | Humidity/Plating Solution Resistance | | Fixing Strength | |
|---|---|---|---|---|---|---|---|---|---|---|---|
| | | | | SiO$_2$ | B$_2$O$_3$ | A$_2$O | | Number of Defects | Judgment | N/cm$^2$ | Judgment |
| 14 | 51 | 8.5 | 4.5 | 55 | 15 | 30 | 45 | 0/74 | ○ | 12 | ○ |
| 15 | 51 | 10 | 4.5 | 55 | 15 | 30 | 55 | 0/74 | ○ | 11 | ○ |
| 16 | 51 | 11 | 4.5 | 55 | 15 | 30 | 60 | 0/74 | ○ | 13 | ○ |
| 17* | 51 | 12 | 4.5 | 55 | 15 | 30 | 63 | 16/74 | x | 16 | ○ |

*indicates out of the range of the present invention.

As shown in Table 2, it was found that in Sample No. 11, since the volume content of the glass frit was low, such as 5 percent by volume, and thereby the occupation rate of the glass phase 25 was also low, such as 27%, the fixing strength was low, such as 4 N/cm$^2$, and hence the fixing strength was inferior.

In addition, it was found that in Sample No. 17, since the volume content of the glass frit was high, such as 12 percent by volume, and thereby the occupation rate of the glass phase 25 was high, such as 63%, a large amount of the glass phase 25 was present in the surface layer of the external electrode 22, and the plating film was discontinuously formed. Furthermore, it was also found that since a plating solution intruded into the external electrode 22, the humidity/plating solution resistance was inferior, and in particular, the plating solution resistance was inferior.

On the other hand, it was found that in Samples Nos. 12 to 16, since the occupation rate of the glass phase 25 in the external electrode 22 was 30% to 60% on the area ratio and was in the range of the present invention, even if the external electrode had a small thickness of 7 μm or less, preferable humidity/plating solution resistance could be secured without degrading the fixing strength.

Example 3

Except that the aspect ratio a/b of the Cu powder was variously changed, test elements of Samples Nos. 21 to 30 were formed by a method and a procedure similar to those in Example 1. In addition, the aspect ratio a/b was measured by a method similar to that in Example 1.

Next, the cross section of the test element of each of Samples Nos. 21 to 30 was observed using a SEM. In addition, after whether the surface of the external electrode was fully covered with the Cu film or not was checked, a test element in which the external electrode was fully covered with the Cu film was evaluated as good (○), and a test element in which the external electrode was not fully covered with the Cu film was evaluated as no good (x).

In addition, the cross section of the external electrode of each test element in the central region of the end surface of the base component was observed using a SEM, and the maximum length c of the glass frit in the external electrode was obtained.

Hereinafter, although an example of calculating the maximum length c of the glass phase will be shown using the test element of Sample No. 24, the calculation was also performed for the test element of each of the other samples by a method similar to that described below.

First, as in the case of Example 2, the cross section of one external electrode of Sample No. 24 was polished, and a part thereof in the central region of the end surface of the base component was photographed at a magnification of 2,000 times.

Figure 7:
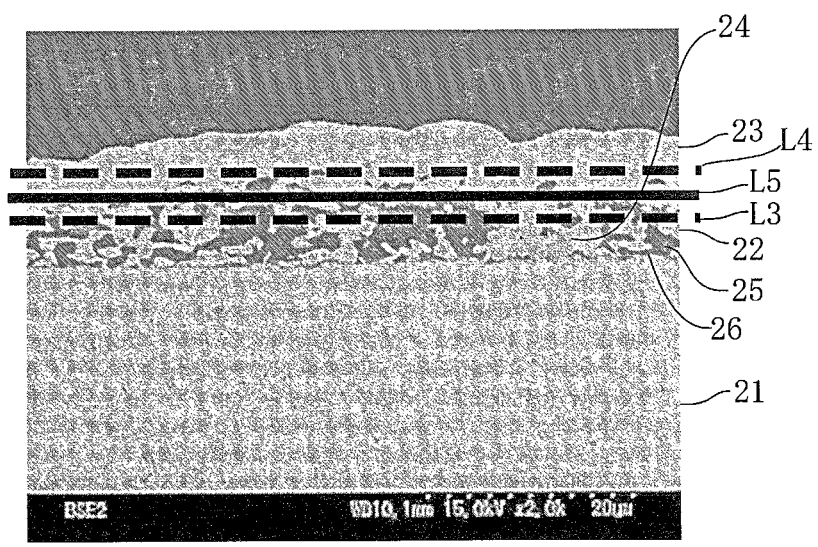
FIG. 7 is a SEM image of Sample No. 24 of Example 3 illustrating one example of the method for calculating a maximum length c of a glass phase.

Next, as shown in FIG. 7, a straight line L3 was drawn which was parallel to the end surface 26 and which passed through the point on the interface between the external electrode 22 and the plating film 23 located at the shortest distance from the end surface 26 of the base component 21, and furthermore, a straight line L4 was drawn which was parallel to the end surface 26 and which passed through the point on the surface of a first plating film of the plating film 23 located at the longest distance from the end surface 26. Subsequently, an intermediate line L5 was drawn which equally divided the distance between the straight line L3 and the straight line L4.

Figure 8:
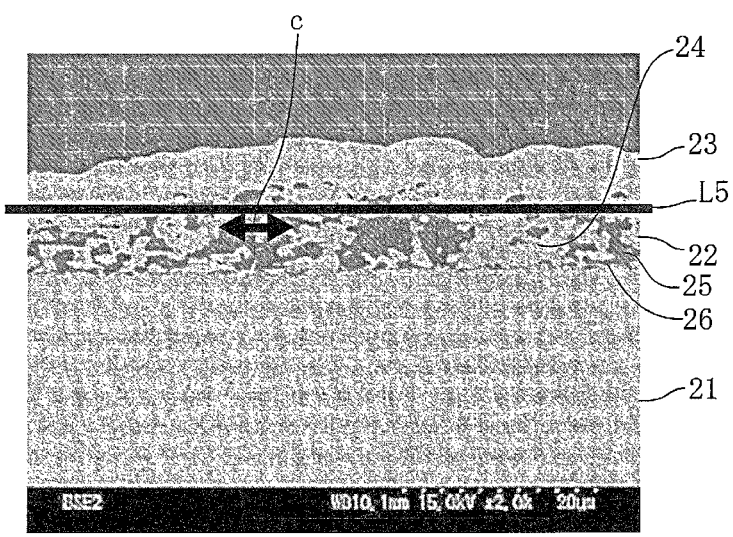
FIG. 8 is the SEM image of Sample No. 24 of Example 3 illustrating one example of the method for calculating a maximum length c of a glass phase.

Next, as shown in FIG. 8, individual lengths parallel to the end surface 26 of the glass phase 25 present on this intermediate line L5 were measured, and among those lengths of the glass phase 25, the maximum value, that is, the maximum length c, was obtained.

Table 3 shows the content of SiO$_2$ before firing, the volume content of the glass frit, the aspect ratio a/b of the Cu powder, the glass composition after firing, the maximum length c of the glass phase, and the plating adhesion properties in each of Samples Nos. 21 to 30.

TABLE 3

| Sample No. | Content of SiO$_2$ before Firing (mol %) | Volume Content of Glass Frit (vol %) | Aspect Ratio a/b of Metal Powder | Glass Composition after Firing (mol %) | | | Maximum Length c of Glass Phase (μm) | Plating Adhesion Properties |
|---|---|---|---|---|---|---|---|---|
| | | | | SiO$_2$ | B$_2$O$_3$ | A$_2$O | | |
| 21* | 51 | 8.5 | 1.5 | 55 | 15 | 30 | 5.6 | x |
| 22 | 51 | 8.5 | 2.5 | 55 | 15 | 30 | 5.0 | ○ |
| 23 | 51 | 8.5 | 3.5 | 55 | 15 | 30 | 4.7 | ○ |
| 24 | 51 | 8.5 | 4.5 | 55 | 15 | 30 | 3.2 | ○ |
| 25 | 51 | 8.5 | 5.5 | 55 | 15 | 30 | 3.5 | ○ |
| 26 | 51 | 8.5 | 6.5 | 55 | 15 | 30 | 3.8 | ○ |
| 27 | 51 | 8.5 | 7.5 | 55 | 15 | 30 | 2.8 | ○ |

TABLE 3-continued

| Sample No. | Content of SiO₂ before Firing (mol %) | Volume Content of Glass Frit (vol %) | Aspect Ratio a/b of Metal Powder | Glass Composition after Firing (mol %) | | | Maximum Length c of Glass Phase (μm) | Plating Adhesion Properties |
|---|---|---|---|---|---|---|---|---|
| | | | | SiO₂ | B₂O₃ | A₂O | | |
| 28 | 51 | 8.5 | 8.5 | 55 | 15 | 30 | 2.6 | ○ |
| 29 | 51 | 8.5 | 9.5 | 55 | 15 | 30 | 1.9 | ○ |
| 30 | 51 | 8.5 | 10.5 | 55 | 15 | 30 | 1.5 | ○ |

*indicates out of the range of the present invention.

As apparent from Table 3, in the test element of Sample No. 21, since the aspect ratio a/b was low, such as 1.5, the maximum length c of the glass phase 25 was increased to 5.6 μm. Hence, it was found that the amount of the metal powder functioning as an origin to form a plating film was decreased in the surface layer, and the plating adhesion properties were degraded.

On the other hand, it was found that in Samples Nos. 22 to 30, since a Cu powder having an aspect ratio a/b of 2.5 or more was used, the maximum length c of the glass phase 25 was decreased to 5 μm or less, and preferable plating adhesion properties could be secured.

REFERENCE SIGNS LIST 2 internal electrode
3 internal electrode
4 base component
5a, 5b external electrode
6a, 6b first plating film (plating film)
7a, 7b second plating film (plating film)
8a, 8b third plating film (plating film)
10 glass phase

The invention claimed is:

1. An electronic component comprising:
an external electrode covering an end portion of a base component; and
at least one plating film on a surface of the external electrode,
wherein the external electrode was sintered in a state in which a glass phase containing at least a Si component and metal portions are mixed together,
a molar content of the Si component in the glass phase is 38 percent by mole to 60 percent by mole in the form of SiO₂,
an occupation rate of the glass phase in the external electrode is 30% to 60% on an area ratio, and a maximum length c of the glass phase is 5 μm or less,
in a central region of an end surface of the base component, the occupation rate is calculated using as a measurement region which is an area surrounded by the end surface and a first straight line which is parallel to the end surface and which passes through a first point on the interface between the external electrode and the plating film located at a shortest distance from the end surface of the base component, and
in the central region of the end surface of the base component, the glass phase present on an intermediate line which equally divides a distance between the first straight line and a second straight line which is parallel to the end surface and which passes a second point on the surface of the plating film in contact with the interface located at a longest distance from the end surface of the base component is extracted, and of the glass phase thus extracted, the maximum length c indicates the maximum value of a length parallel to the end surface.

2. The electronic component according to claim 1, wherein a penetration distance of the glass phase into the base component is 1 μm or less.

3. The electronic component according to claim 1, wherein the molar content of the Si component in the glass frit is 45 percent by mole to 60 percent by mole in the form of SiO₂.

* * * * *